No. 794,884. PATENTED JULY 18, 1905.
M. L. PORTER.
FRUIT GATHERER.
APPLICATION FILED DEC. 22, 1904.
3 SHEETS—SHEET 2.
FIG. 3.
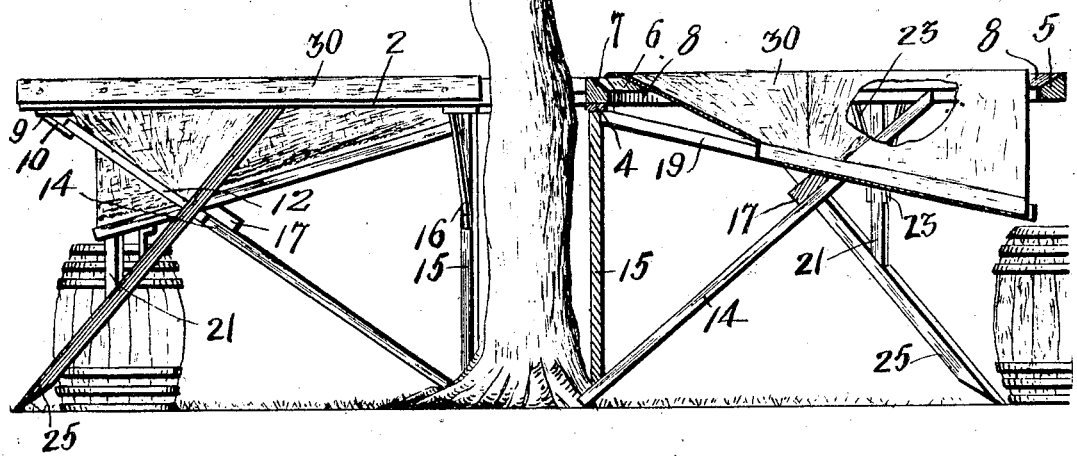
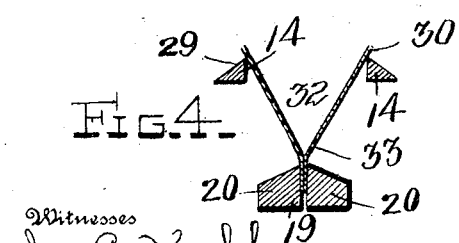
FIG. 4.
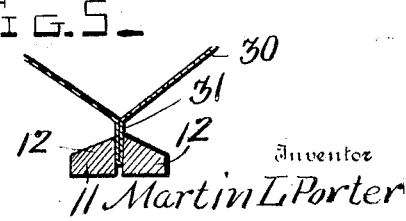
FIG. 5.
Inventor
Martin L Porter
By H. R. Wilson
Attorney
Witnesses
Jas. A. Koehl

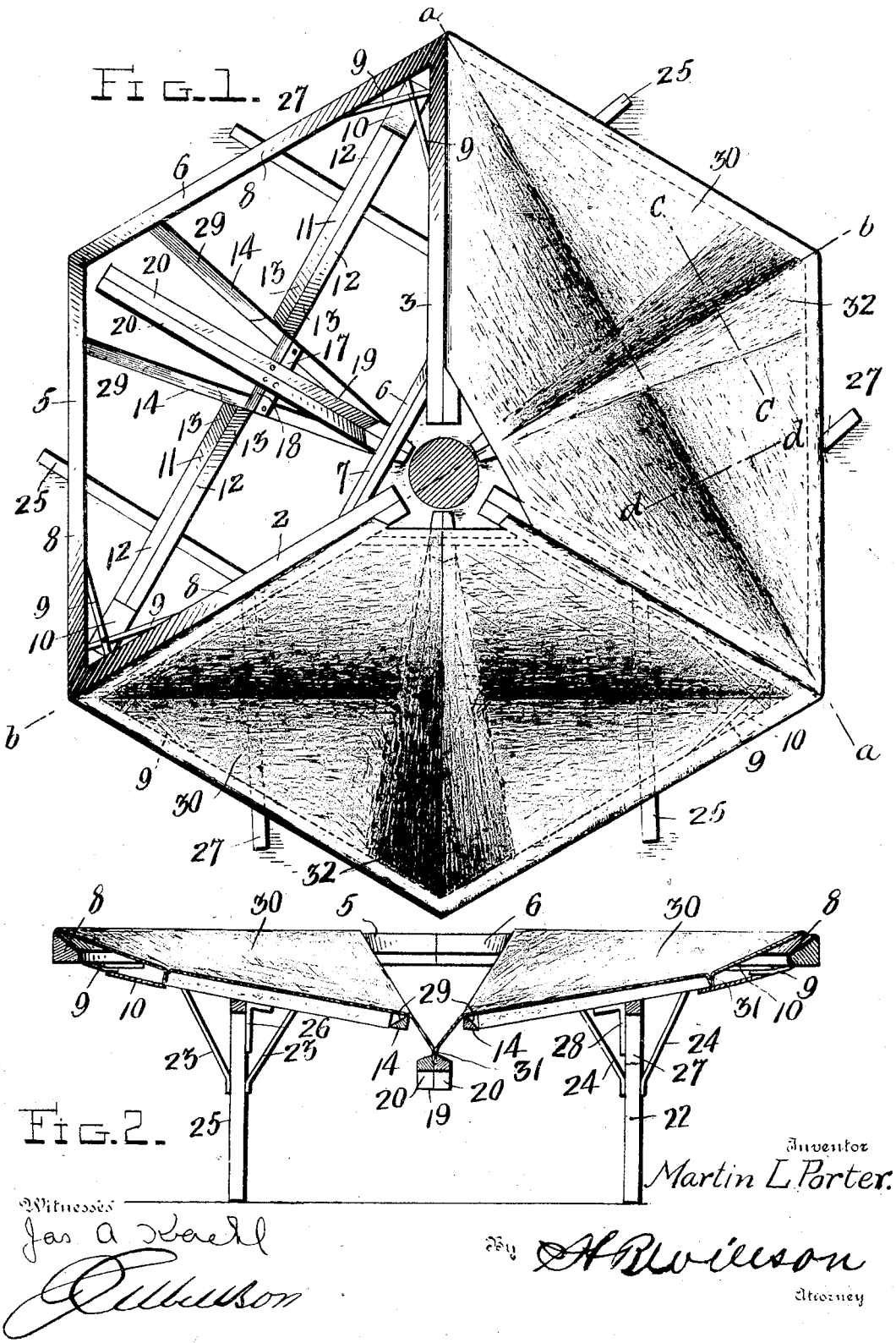

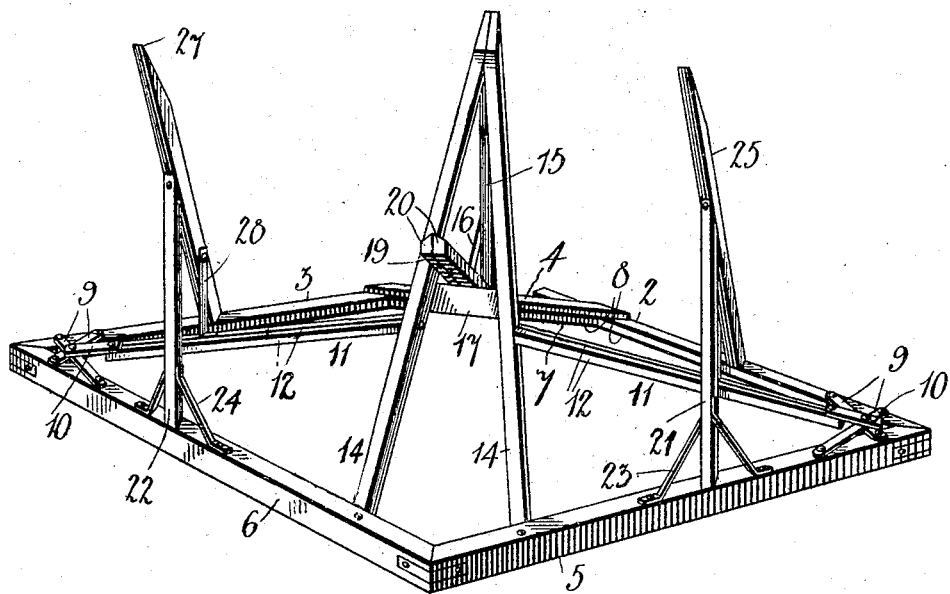

No. 794,884. Patented July 18, 1905.

UNITED STATES PATENT OFFICE.

MARTIN LUTHER PORTER, OF REDDING, CALIFORNIA.

FRUIT-GATHERER.

SPECIFICATION forming part of Letters Patent No. 794,884, dated July 18, 1905.

Application filed December 22, 1904. Serial No. 238,022.

*To all whom it may concern:*

Be it known that I, MARTIN LUTHER PORTER, a citizen of the United States, residing at Redding, in the county of Shasta and State of California, have invented certain new and useful Improvements in Fruit-Gatherers; and I do declare the following to be a full, clear, and exact description of the invention, such as will enable others skilled in the art to which it appertains to make and use the same.

My invention is an improved fruit-gatherer comprising a supporting-frame and a fabric stretched on the frame and onto which the fruit falls from the tree, the frame being composed of separable sections adapted to be united around a tree; and it consists in the construction and combination of devices hereinafter described and claimed.

The object of my invention is to provide an improved device of this character which is light, strong, cheap, and portable and is provided with means for preventing the fruit from being bruised when it is dropped onto the device, and thereby injured.

In the accompanying drawings, Figure 1 is a partial top plan view of a fruit-gatherer embodying my improvements. Fig. 2 is a sectional view taken on the plane indicated by the line *a a* of Fig. 1. Fig. 3 is a similar view taken on the plane indicated by the line *b b* of Fig. 1. Fig. 4 is a detail sectional view taken on the plane indicated by the line *c c* of Fig. 1. Fig. 5 is a similar view taken on the plane indicated by the line *d d* of Fig. 1. Fig. 6 is a detail inverted perspective view of one of the sections.

The frame of my improved fruit-gatherer may be of any suitable form. It is indicated in Fig. 1 as of hexagonal form and as comprising three separable sections, all of which are adapted to be assembled around the tree, so as to support the fabric under the tree and above the ground to catch the fruit dropped from the tree. I will now describe one of the said sections.

The frame of each section has a pair of radially-disposed bars 2 3, which are connected together near their inner ends by a diagonally-disposed plate 4. The extreme inner ends of the bars 2 3 are separated from each other, and the sections when united form an opening at their center for the trunk of the tree. The outer ends of the radial bars 2 3 are connected together by a pair of outer bars 5 6. The plate 4 is secured to the under side of the radial bars 2 3, and on the said plate and between the said bars is disposed a diagonally-arranged bar 7. The upper sides of the bars 2, 3, 5, 6, and 7 are beveled or inclined, so that they present laterally-inclined inwardly-descending surfaces 8. The said bars are disposed in the same horizontal plane.

At the angles between the bars 2 3 5 6, on the under sides thereof, are crossed brace-irons 9. To the intersecting portions thereof are bolted the outer ends of iron or other metallic plates 10, which are bolted to the under sides of inwardly-extending outwardly-inclined bars 11, each of which comprises two longitudinal sections 12, having their upper sides oppositely beveled, as at 13. A pair of radially-disposed inclined bars 14 have their outer ends secured to the bars 5 6 near the angle formed thereby. The inner ends of the said inclined bars 14 rest on the ground and are under the plate 4 and bars 7 and are connected to the latter by a standard or supporting-leg 15, which is here shown as provided with braces 16, that are connected to the plate 4 near their centers. The said bars 14 are connected together by a plate 17, which is secured on the upper sides thereof and is at the outer edge beveled or inclined, as at 18. An inclined bar 19, which comprises a pair of sections 20, that are similar in construction to the sections 12 of the bars 11, have their inner ends attached to the central portion of the plate 4. The said inclined bar 19 passes between the bars 14, rests on the inclined or beveled edge 18 of the plate 17, and is secured to the said plate by a bolt, screw, or other suitable device. The inclined ends of the bars 11 are also secured to the said inclined bars 14 near the centers of the latter.

From the under side of the bar 5, at or near the center thereof, depends the standard 21, and a similar standard 22 depends from the center of the bar 6. Said standards are respectively provided with braces 23 24.

An inclined foot-bar 25 has its outer end secured to the bar 2 near the center thereof. The inclined end of the said foot-bar rests on the ground and the lower end of the standard 21 is secured on said foot-bar. A brace 26 connects said foot-bar to the bar 11. A foot-bar 27, which is similar to the bar 25, is secured to the bar 3, is connected to the other bar 11 by a brace 28, and the lower end of the standard 22 is secured on the said foot-bar 27.

It will be understood from the foregoing and by reference to the drawings that the bars 11 and the outer portions of the bars 14 and 19 converge downwardly. The upper portions of the inclined bars 14 have their upper sides oppositely beveled or inclined, as at 29.

The fabric 30, which covers each frame-section, may be of canvas or any other suitable material. Its upper edges are secured on the outer upper edges of the bars 2, 3, 5, 6, and 7. This fabric presents a plurality of downwardly-converging inclined surfaces. Being attached to the outer or upper edges of the frame-bars and its inclined surfaces being angularly disposed with reference to the inclined upper surfaces of the frame-bars, said fabric is out of contact with the said surfaces of the frame-bars, and the latter are prevented from bruising the fruit which drops upon the fabric from the tree. The troughs formed by the inclined surfaces of the fabric above the bars 11 are provided with depending webs 31, which are secured between the sections of the said bars. The latter are at some distance below the fabric and are entirely out of contact therewith, and the webs connected to the bars serve to spread the fabric and keep it comparatively rigid. The various inclined surfaces of the fabric meet at the center of the frame-section and cause the fruit to roll thereto. The portion of the fabric between the upper portions of the inclined bars 14 extends downwardly therefrom to form a discharge-trough 32, as shown in detail in Fig. 4, which discharge-trough leads from the center of the frame-section and serves to convey the fruit by gravity from the fabric to a suitable receptacle. From the center of this trough depends a web 33 similar to the webs 31, hereinbefore described, which web 33 is secured between the lower portions of the sections of the inclined bar 19.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A fruit-gatherer comprising a frame having members provided with laterally-inclined upper surfaces, and a fabric attached to the said members at the upper portion of their inclined surfaces and otherwise out of contact therewith.

2. A fruit-gatherer comprising a frame, a fabric supported thereon, having downwardly-converging inclined surfaces, depending webs, and bars to which the webs are secured.

3. In a fruit-gatherer, a fabric having downwardly-converging surfaces, webs depending from the angles thereof, and bars to which the depending webs are secured.

4. A fruit-gatherer comprising a plurality of separable sections each composed of a frame having a pair of radial bars forming two sides thereof, outer side bars connecting the radial bars together, supports for the frame, inclined bars extending transversely under the frame from the angles thereof, and a fabric attached to the sides and inclined bars of the frame and having downwardly-converging surfaces.

In testimony whereof I have hereunto set my hand in presence of two subscribing witnesses.

MARTIN LUTHER PORTER.

Witnesses:
ALEX. LUDWIG,
GEORGE O. PERRY.